(12) United States Patent
Kia et al.

(10) Patent No.: US 10,243,188 B2
(45) Date of Patent: Mar. 26, 2019

(54) SEPARATOR FOR LITHIUM-BASED BATTERIES

(71) Applicant: GM GLOBAL TECHNOLOGY OPERATIONS LLC, Detroit, MI (US)

(72) Inventors: Hamid G. Kia, Bloomfield Hills, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 699 days.

(21) Appl. No.: 14/734,972

(22) Filed: Jun. 9, 2015

(65) Prior Publication Data

US 2016/0365558 A1  Dec. 15, 2016

(51) Int. Cl.
*H01M 2/14*  (2006.01)
*H01M 2/16*  (2006.01)
*H01M 10/052*  (2010.01)

(52) U.S. Cl.
CPC ......... *H01M 2/1686* (2013.01); *H01M 2/145* (2013.01); *H01M 2/162* (2013.01); *H01M 2/1626* (2013.01); *H01M 2/1653* (2013.01); *H01M 2/1666* (2013.01); *H01M 10/052* (2013.01)

(58) Field of Classification Search
CPC .................................................. H01M 2/1686
See application file for complete search history.

(56) References Cited

U.S. PATENT DOCUMENTS

| | | | |
|---|---|---|---|
| 3,929,509 A | 12/1975 | Taskier | |
| 6,537,696 B2 | 3/2003 | Whear et al. | |
| 7,638,241 B2 | 12/2009 | Lee et al. | |
| 8,460,829 B1 | 6/2013 | Huang et al. | |
| 8,951,654 B2 | 2/2015 | Sachdev et al. | |
| 8,993,646 B2 | 3/2015 | Huang | |
| 9,028,565 B2 | 5/2015 | Huang | |
| 9,138,932 B2 | 9/2015 | Huang | |
| 9,324,984 B2 | 4/2016 | Huang et al. | |
| 9,346,066 B2 | 5/2016 | Huang | |
| 2011/0200863 A1 | 8/2011 | Xiao et al. | |
| 2011/0229750 A1 | 9/2011 | McLellan et al. | |
| 2011/0236762 A1 | 9/2011 | Huang et al. | |
| 2012/0082893 A1 | 4/2012 | Halalay et al. | |
| 2012/0102725 A1 | 5/2012 | Fuller et al. | |

(Continued)

FOREIGN PATENT DOCUMENTS

EP  0981172  9/2004

OTHER PUBLICATIONS

Jun Young Kim, et al. "Surface-Modified Membrane as a Separator for Lithium-Ion Polymer Battery" Energies; 2010; vol. 3; pp. 866-885; ISSN 1996-1073.

(Continued)

*Primary Examiner* — Stephan J Essex
(74) *Attorney, Agent, or Firm* — Harness, Dickey & Pierce, P.L.C.

(57) ABSTRACT

A separator includes a non-woven substrate. The non-woven substrate includes a first and a second side. An adhesive coating is disposed on the first side, the second side, or both the first and second sides of the non-woven substrate. The adhesive coating is a surfactant. A porous polymer layer is disposed on the adhesive coating such that the adhesive coating forms an intermediate layer between the non-woven substrate and the porous polymer layer.

18 Claims, 3 Drawing Sheets

(56) References Cited

U.S. PATENT DOCUMENTS

| | | |
|---|---|---|
| 2012/0115009 A1* | 5/2012 | Okuno ............ H01M 2/1646 429/145 |
| 2012/0156568 A1 | 6/2012 | Kia et al. |
| 2012/0156569 A1 | 6/2012 | Kia et al. |
| 2012/0308872 A1 | 12/2012 | Huang |
| 2012/0309860 A1 | 12/2012 | Huang |
| 2012/0315384 A1 | 12/2012 | Abd Elhamid et al. |
| 2013/0004857 A1 | 1/2013 | Kia et al. |
| 2013/0034778 A1 | 2/2013 | Patoux et al. |
| 2013/0052509 A1 | 2/2013 | Halalay et al. |
| 2014/0212748 A1 | 7/2014 | Zhang et al. |

OTHER PUBLICATIONS

Sheng Shu Zhang "A Review on the Separtors of Liquid Electrolyte Li-ion Batteries"; ScienceDirect Journal of Power Sources; 2007; vol. 164; pp. 351-364.

* cited by examiner

SEPARATOR FOR LITHIUM-BASED BATTERIES

BACKGROUND

Secondary, or rechargeable, lithium ion batteries or lithium sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example of a separator includes a non-woven substrate. The non-woven substrate includes a first and a second side. An adhesive coating is disposed on the first side, the second side, or both the first and second sides of the non-woven substrate. The adhesive coating is a surfactant. A porous polymer layer is disposed on the adhesive coating such that the adhesive coating forms an intermediate layer between the non-woven substrate and the porous polymer layer.

Examples of the separator disclosed herein may be included in a lithium ion battery or a lithium sulfur battery.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
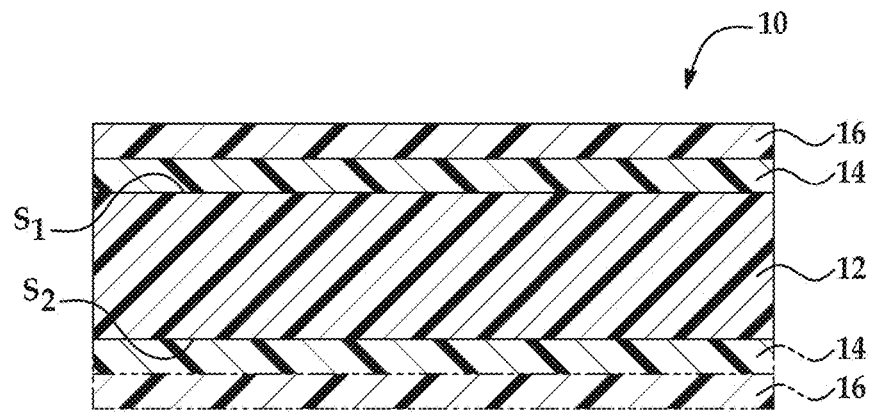
FIG. 1 is a cross-sectional view of an example of the separator used in lithium-based batteries disclosed herein.

Separators are used in lithium-based batteries to prevent physical contact between the negative and positive electrodes while allowing the passage of ions in an electrolyte. Some separator materials are formed from materials that provide good wettability when in contact with the electrolyte of the battery, such as non-woven cellulosic fiber substrates. Due to having suitable wetting characteristics, the non-woven substrates may be used without hydrophilic surface treatments.

In examples of the separator disclosed herein, a non-woven substrate may be used to form a portion of the separator for lithium-based batteries. The non-woven substrate has a contact angle of less than 90° C. when exposed to a battery electrolyte. In addition, examples of the non-woven substrate disclosed herein may exhibit dimensional stability (i.e., volume shrinkage of less than 5% when the non-woven substrate is heated to 100° C. for about 2 hours). The non-woven substrate also has relatively large pores, which if left as is, may lead to short circuiting of lithium-based batteries. It has been unexpectedly found that adding a surfactant in and on the pores and on fibers of this non-woven substrate, prior to forming a porous polymer layer in contact therewith, increases the adhesion between the substrate and porous polymer layer. The surfactant forms an intermediate layer that acts as an adhesive coating. The surfactant prevents or reduces instances where the porous polymer layer separates from the non-woven substrate when being handled during the manufacturing of the battery and/or during charging and discharging of the lithium-based batteries. As a result, the surfactant improves the durability of the separator, thereby increasing the battery life and the abuse tolerance.

In addition to improving the adhesion between the non-woven substrate and porous polymer layer, the surfactant substantially covers the pore walls or fiber surfaces (e.g., greater than 90% of the pore walls (i.e., fiber surfaces) are covered) of the non-woven substrate and maintains the porous polymer layer in a position that effectively blocks the pores of the non-woven substrate. It is to be understood that the pores of the porous polymer layer are significantly smaller than the pores of the non-woven substrate. As such, the porous polymer layer blocks the passage of undesirable species (e.g., lithium dendrites, conductive fillers (e.g., carbon black), or lithium-polysulfide intermediates ($LiS_x$, where x is $2<x<8$)) through the separator.

The blockage of the passage of lithium-polysulfide intermediates improves the lithium-sulfur battery performance. The lithium-sulfur battery performance is improved because the shuttling of lithium-polysulfide intermediates is reduced or prevented. Lithium-polysulfide intermediates are generated at the sulfur-based positive electrode. The lithium-polysulfide intermediates are soluble in the electrolyte, and can migrate to the negative electrode (e.g., a silicon electrode) where they react with the negative electrode in a parasitic fashion to generate lower-order lithium-polysulfide intermediates. These lower-order lithium-polysulfide intermediates diffuse back to the positive electrode and regenerate the higher forms of lithium-polysulfide intermediates. As a result, a shuttle effect takes place. This effect leads to decreased sulfur utilization, self-discharge, poor cycleability, and reduced Coulombic efficiency of the battery. However, by blocking the lithium-polysulfide intermediates with the porous polymer layer disclosed herein, the lithium-sulfur battery performance improves.

Turning to FIG. 1, an example of the separator 10 disclosed herein is shown. The separator 10 includes the non-woven substrate 12, the adhesive coating or intermediate layer 14 disposed in contact with non-woven substrate 12, and the porous polymer layer 16 disposed on the adhesive coating 14. The non-woven substrate 12 includes a first side $S_1$, a second side $S_2$, and pores (not shown in FIG. 1) throughout a thickness of the non-woven substrate 12.

Each of the first and second sides $S_1$, $S_2$ forms an exterior surface of the non-woven substrate 12 and is defined by fibers and pores of the non-woven substrate 12. It is to be understood that the separator 10 may include the adhesive coating 14 on the first side $S_1$, the second side $S_2$, or both the first and the second sides $S_1$, $S_2$ of the non-woven substrate 12. The phrase, on the first side and/or on the second side, means that the adhesive coating 14 may penetrate into the pores of the non-woven substrate 12 and/or may be on the fibers that form the non-woven substrate 12.

The non-woven substrate 12 forms the base of the separator 10. The non-woven substrate 12 exhibits suitable wetting properties without any type of hydrophilic surface treatment. It is to be understood that the non-woven substrate 12 is not treated to improve the wettability of the non-woven substrate 12 with the battery electrolyte. In an example, the non-woven substrate 12 may include any substrate that has a contact angle of less than 90° C. when exposed to a battery electrolyte. In addition, examples of the non-woven substrate 12 herein exhibit a volume shrinkage of less than 5% when the substrate 12 is heated to 100° C. for about 2 hours. These properties of the non-woven substrate 12 render the substrate with a natural wettability with the battery electrolyte, thermal stability, and mechanical strength.

The non-woven substrate 12 includes the first side $S_1$ and the second side $S_2$, for example, as shown in FIG. 1. As mentioned above, the non-woven substrate 12 may also be porous. The pores (not shown in FIG. 1) of the non-woven substrate 12 may have a pore diameter ranging from about 0.5 μm to about 30 μm. Some examples of the non-woven substrate 12 are formed of cellulose fiber, polyethylene naphthalate fibers, aramid fibers (i.e., aromatic polyamide), polyimide fibers, and polyethylene terephthalate (PET). It is to be understood that the non-woven substrate 12 is not a polyolefin. One specific example of the non-woven substrate 12 is a non-woven cellulose fiber mat. In another example, the non-woven substrate 12 is a PET fiber mat.

The adhesive coating 14 may be applied to the first side $S_1$, the second side $S_2$, or both the first and the second sides $S_1$, $S_2$ of the non-woven substrate 12. It is to be understood that the adhesive coating 14 may coat the surfaces of the pores within the non-woven substrate 12 (not shown in FIG. 1). The adhesive coating 14 may also be applied to the pore wall(s)/fiber surface(s) on the exterior surface(s) of the non-woven substrate 12. The adhesive coating 14 chemically or physically bonds the porous polymer layer 16 to the non-woven substrate 12.

In an example, the adhesive coating 14 may be applied after the manufacturing of the non-woven substrate 12. For example, the adhesive coating 14 may be applied to the non-woven substrate 12 with a die coating, a spray coating, or a dip coating process. In another example, the adhesive coating 14 may be applied to the non-woven substrate 12 during the manufacturing process of the non-woven substrate 12. For example, the adhesive coating 14 may be applied during the wet-laid process for making the non-woven substrate 12. In other examples, the adhesive coating 14 may also be applied using any other suitable technique. It is to be understood that the adhesion coating 14 forms an intermediate layer of the separator 10 as shown in FIG. 1.

In one example, the adhesive coating 14 may be a surfactant, such as an amphiphilic organic compound. One example of the amphiphilic organic compound may be a sulfonate or a sulfate. Some examples of sulfonates or sulfates include dodecylbenzenesulfonate, ammonium lauryl sulfate, sodium lauryl sulfate, and alkyl-ether sulfates (e.g., sodium laureth sulfate and sodium myreth sulfate). In another example, the surfactant may be a phosphate. Some examples of phosphates include trinonyl methyl ammonium phosphate and isooctyl alcohol polyoxyethylene phosphate. In yet another example, the surfactant may be a nonionic surfactant. Some examples of nonionic surfactants include octaethylene glycol monododecyl ether, decyl glucoside, and polyoxyethylene glycol octylphenol ethers. Other examples of the surfactant include sodium stearate, carboxylates, ammonium chloride, or ammonium bromide. It is to be understood that combinations of any of the surfactants listed herein may be used as the adhesive layer 14.

As shown in FIG. 1, a porous polymer layer 16 is disposed on the adhesive coating 14. A polymer solution (not shown in FIG. 1) may be used to form the porous polymer layer 16. In one example, the polymer solution includes a polymer and a solvent of the polymer. In another example, the polymer solution includes a polymer, inorganic particles, and the solvent. The polymer may be present in the polymer solution in an amount ranging from about 3% to about 50% of the total wt % of the polymer solution. Some examples of the polymer include polyvinylidene fluoride (PVDF), polyamides, polyimides, polysulfone, and a combination thereof. Examples of polyamides include aliphatic polyamides, semi-aromatic polyamides, or aramids (e.g, meta-aramid). An example of a suitable polyimide is polyetherimide.

The solvent used in the polymer solution depends on the type of polymer used to form the solution. In an example, when PVDF is used as the polymer, the solvent may be acetone, N-methyl-2-pyrrolidone (NMP), dimethyl sulfoxide (DMSO), tetrahydrofuran (THF), dimethylformamide (DMF), or butanone. In another example, when a polyamide (e.g., meta-aramid) is used as the polymer, the solvent may be N-methyl-2-pyrrolidone (NMP), dimethylacetamide (DMAc), dimethylformamide (DMF), dimethyl sulfoxide containing LiCl or $CaCl_2$, tetramethylurea (TMU), acetone, methylene chloride, chloroform, tetrahydrofuran (THF), or 1,4-dioxane. In yet another example, in some instances when an aromatic or semi-aliphatic polyimide is used as the polymer, the solvent may be N-methyl-2-pyrrolidone (NMP), dimethyl sulfoxide (DMSO), and dimethylformamide (DMF). In a further example, when a polysulfone is the polymer, the solvent may be a ketone, such as acetone, a chlorinated hydrocarbon, such as chloroform, aromatic hydrocarbons, N-methyl-2-pyrrolidone (NMP), or dimethyl sulfoxide (DMSO). Some specific examples of a polymer-solvent system include PVDF as the polymer and acetone as the solvent. In another example, the polymer is polyetherimide or meta-aramid and the solvent is N-methyl-2-pyrrolidone (NMP), dimethylacetamide (DMAc), dimethylformamide (DMF), dimethyl sulfoxide containing LiCl or $CaCl_2$, N-methyl-2-pyrrolidone (NMP) containing LiCl or $CaCl_2$, or dimethylformamide (DMF) containing LiCl or $CaCl_2$.

In examples that include inorganic particles, the inorganic particles have a particle diameter of less than 2 μm. In another example, the inorganic particles have a particle size diameter ranging from about 100 nm to about 1 μm. The amount of inorganic particles depends, in part, on the amount of polymer used in the polymer solution. In an example, the inorganic particles may be present in an amount ranging from 10 wt % to about 300 wt % of the total wt % of the polymer in the polymer solution. Some examples of the inorganic particles include alumina, silica, titania or combinations thereof.

The polymer solution may be coated onto the adhesive coating 14. Since the adhesive coating 14 has been applied on the first side $S_1$, the second side $S_2$, or both the first and the second sides $S_1$, $S_2$ of the non-woven substrate 12, the polymer solution may also be indirectly on the first side $S_1$ and/or the second side $S_2$ of the non-woven substrate 12.

After the polymer solution is disposed on the adhesive coating 14 on the non-woven substrate 12, additional process(es) is/are performed to form the porous polymer layer 16 on the adhesive coating 14. In an example, a phase inversion process may be used to form the porous polymer layer 16. Phase inversion may be initiated by exposing the polymer solution to a non-solvent. Exposure to a non-solvent may be accomplished using a humidity chamber or a water bath. When the humidity chamber is used, the non-solvent is water vapor. In an example, when a humidity chamber is used, the humidity chamber has a relative humidity of greater than 50%. When the water bath is used, the non-solvent may be water, alcohols (e.g., ethanol or isopropanol), or combinations thereof. The polymer solution may be exposed to the non-solvent for a time ranging from about 2 seconds to about 10 minutes depending on the materials and desired coating thickness. For example, polyetherimide dissolved in NMP may be exposed to the non-solvent for a time ranging from about 10 seconds to about 1 minute. In another example, meta-aramid dissolved in NMP containing LiCl or $CaCl_2$ may be exposed to the non-solvent for greater than 1 minute.

The non-solvent precipitates the polymer from the polymer solution. Residual solvent and/or non-solvent is removed by vacuum drying, evaporation, etc. As a result, the dried precipitated polymer forms the porous polymer layer 16. In instances where inorganic particles are included in the polymer solution, the inorganic particles are embedded in the polymer and together the polymer and inorganic particles are precipitated to form the porous polymer layer 16 that includes inorganic particles.

When the non-solvent precipitates the polymer from the polymer solution, the diameter of the pores formed in the porous polymer layer 16 may be controlled. The pore diameter of the porous polymer layer 16 may be controlled by adjusting the process parameters, such as the polymer concentration, amount of non-solvent used, moisture content, etc. As examples, if a higher polymer concentration is used with a lower moisture content, the diameter of the pores may be smaller. In an example, the pore diameter of the porous polymer layer 16 ranges from about 30 nm to about 30 µm.

The separator 10 may be used in a lithium ion battery or lithium sulfur battery. The lithium ion battery 20, shown in FIG. 2, and the lithium sulfur battery 30, shown in FIG. 3, are described in greater detail below.

Figure 2:
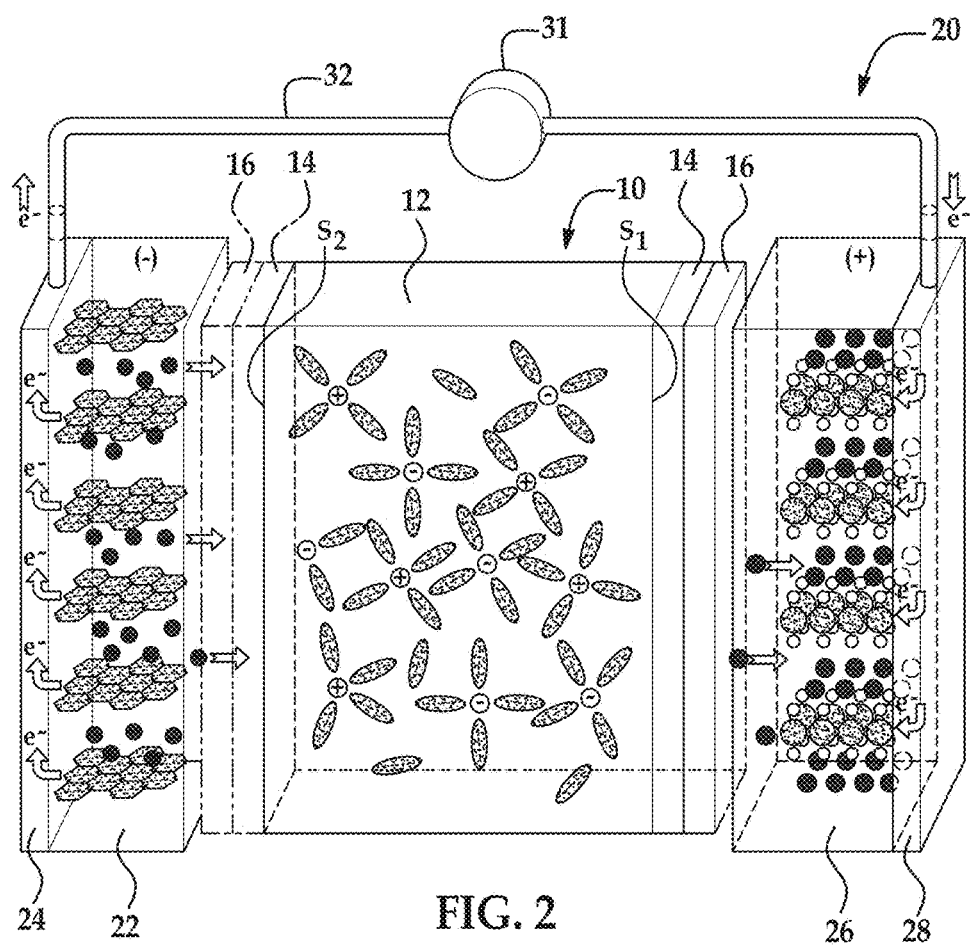
FIG. 2 is a perspective, schematic view of an example of a lithium ion battery, including an example of the separator disclosed herein.
Figure 3:
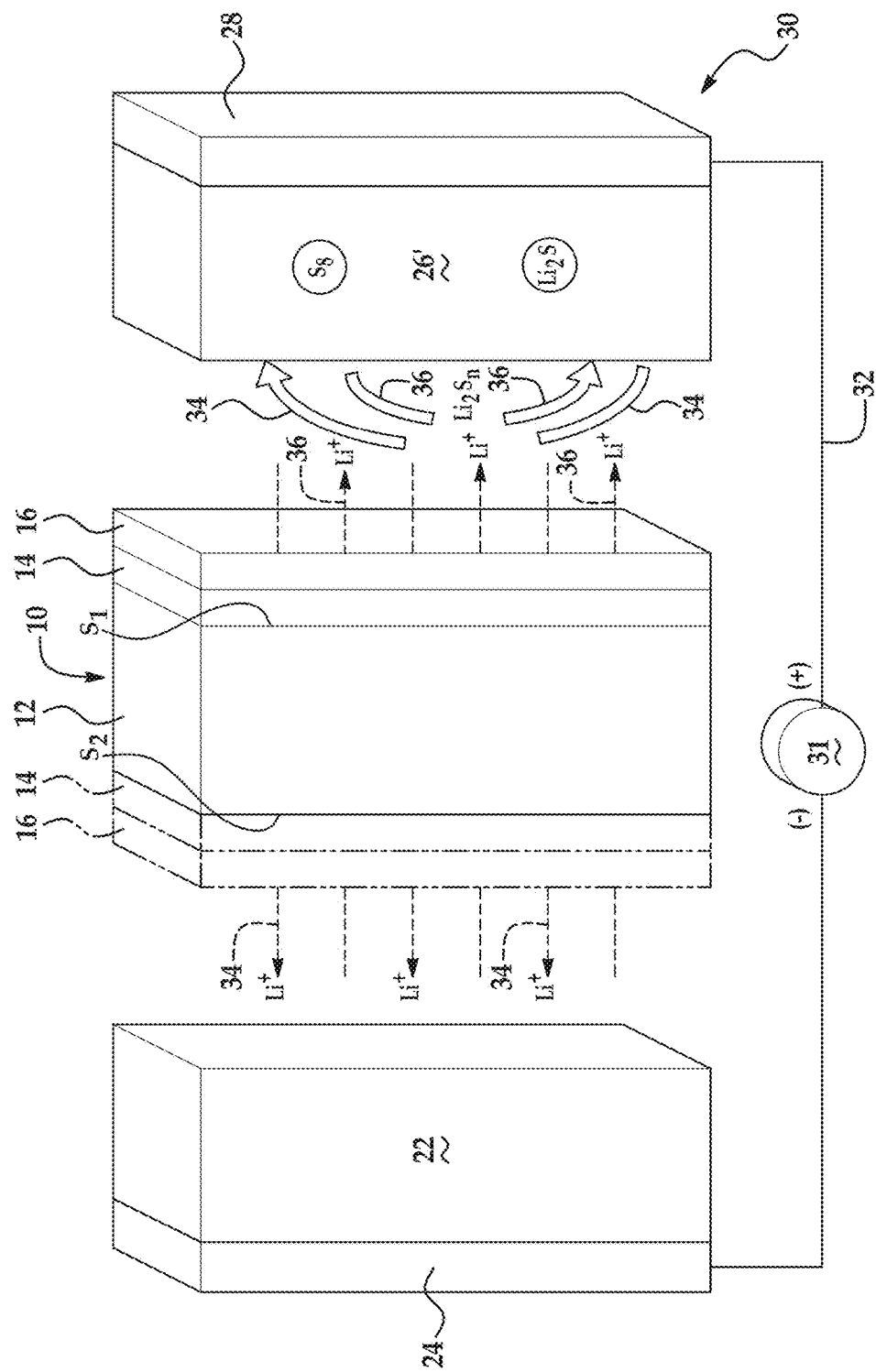
FIG. 3 is a perspective, schematic view of an example of a lithium sulfur battery, including an example of the separator disclosed herein.

Referring now to FIG. 2, the lithium ion battery 20 is shown including examples of the separator 10 disclosed herein. The lithium ion battery 20 includes a negative electrode 22, a positive electrode 26, and the separator 10 positioned therebetween. The negative electrode 22 and the positive electrode 26 are disposed on a negative electrode current collector 24 and a positive electrode current collector 28, respectively. The lithium ion battery 20 also includes an interruptible external circuit 32 that connects the negative electrode 22 and the positive electrode 26.

For the lithium ion battery 20, the positive electrode 26 includes a positive electrode active material, a polymer binder, and a conductive filler. The positive electrode active material may be any lithium-based active material that can sufficiently undergo lithium insertion and deinsertion while aluminum or another suitable current collector 28 is functioning as the positive terminal of the battery 20. The positive electrode active material may be selected from a common class of lithium-based active materials. This class includes layered lithium transitional metal oxides. Some specific examples of the lithium-based active materials include spinel lithium manganese oxide ($LiMn_2O_4$), lithium cobalt oxide ($LiCoO_2$), a nickel-manganese oxide spinel [$Li(Ni_{0.5}Mn_{1.5})O_2$], or a lithium iron polyanion oxide, such as lithium iron phosphate ($LiFePO_4$) or lithium iron fluorophosphate ($Li_2FePO_4F$). In still another example, a layered nickel-manganese-cobalt oxide (LiNMC or NMC) [$Li(Ni_xMn_yCo_z)O_2$ or $Li(Ni_xMn_yCo_z)O_4$] may be used. In examples of the LiNMC, each of x, y, and z may be ⅓ (i.e., LiNMC 1,1,1), or the Ni content may be more, where x=0.6 and each of y and z=0.2 (i.e., LiNMC 6,2,2), or where x=0.8 and each of y and z=0.1, or where x=0.5, y=0.3, and z=0.2 (i.e., LiNMC 5,3,2), or the Mn content may be more than Ni and Co. Other lithium-based active materials may also be utilized, such as $LiNi_xM_{1-x}O_2$(M is composed of any ratio of Al, Co, and/or Mg) where x is any value from greater than 0 to 1 (e.g., 0.2, 0.3, 0.5, 0.6, etc.), aluminum stabilized lithium manganese oxide spinel ($Li_xMn_{2-x}Al_yO_4$), where in an example x and y both equal 1, lithium vanadium oxide ($LiV_2O_5$), $Li_2MSiO_4$ (M is composed of any ratio of Co, Fe, and/or Mn), $xLi_2MnO_3 \cdot (1-x)LiMO_2$ (M is composed of any ratio of Ni, Mn and/or Co) where x is any value from greater than 0 to 1 (e.g., 0.2, 0.3, 0.5, or 0.6), and any other high efficiency nickel-manganese-cobalt material. By "any ratio" it is meant that any element may be present in any amount. So, for example M could be Al, with or without Co and/or Mg, or any other combination of the listed elements.

The lithium-based active material of the positive electrode 26 may be intermingled with the polymer binder and the conductive filler. Suitable binders include polyvinylidene fluoride (PVdF), an ethylene propylene diene monomer (EPDM) rubber, carboxymethyl cellulose (CMC), styrene-butadiene rubber (SBR), polyacrylic acid (PAA), polyvinyl alcohol (PVA), sodium alginate, styrene-butadiene rubber carboxymethyl cellulose (SBR-CMC), polyethylene oxide (PEO), poly(acrylamide-co-diallyl dimethyl ammonium chloride), cross-linked polyacrylic acid-polyethylenimine, other water-soluble or organic solvent based binders, or any other suitable binder material. The polymer binder structurally holds the lithium-based active material and the conductive filler together. An example of the conductive filler is a high surface area carbon, such as acetylene black or activated carbon. The conductive filler ensures electron conduction between THE positive electrode current collector 28 (e.g., aluminum) and the active material of the positive electrode 26. In an example, the positive electrode active material and the polymer binder may be encapsulated with carbon.

The negative electrode 22 includes a negative electrode active material, a polymer binder, and a conductive filler. It is to be understood that any suitable negative electrode active material may be used for the negative electrode 22 of the lithium ion battery 20. Any lithium host material may be used that can sufficiently undergo lithium insertion (e.g., plating or intercalation or alloying) and extraction (e.g., stripping or deintercalation or dealloying) while copper or another suitable current collector 24 is functioning as the negative terminal of the battery 20. In an example, the negative electrode active material is a silicon-based material. In another example, the negative electrode active material is graphite. Graphite is widely utilized as the active material to form the negative electrode because it exhibits reversible lithium intercalation and deintercalation characteristics, is relatively non-reactive, and can store lithium in quantities that produce a relatively high energy density. Commercial forms of graphite that may be used to fabricate the negative electrode active material are available from, for example, Timcal Graphite & Carbon (Bodio, Switzerland), Lonza Group (Basel, Switzerland), or Superior Graphite (Chicago, Ill.). Other materials that can also be used to form the negative electrode active material include, for example, lithium titanate.

In other examples, the negative electrode 22 may also include, in addition to the lithium host material (i.e., active material), a polymer binder to structurally hold the lithium host material together and a conductive filler. For example, the negative electrode 22 may be formed of an active material, made from graphite or a low surface area amorphous carbon, intermingled with a binder, made from polyvinylidene fluoride (PVdF), an ethylene propylene diene monomer (EPDM) rubber, sodium alginate, carboxymethyl cellulose (CMC), or any of the examples previously listed for the positive electrode 26. These materials may be mixed with a high surface area carbon, such as acetylene black or activated carbon as the conductive filler, to ensure electron conduction between the current collector 24 and the active material particles of the negative electrode 22.

To form the positive and negative electrodes 26, 22, the respective active materials of each electrode 26, 22 may be mixed with other electrode components (i.e., the polymer binder and conductive filler) to form a dispersion or slurry. The dispersion or slurry may be deposited onto the respective current collectors 28, 24 of each electrode 26, 22. The dispersion or slurry may be dried on the current collectors 28, 24 to form the positive and negative electrodes 26, 22.

The negative electrode 22 may also be pre-lithiated using any suitable pre-lithiation technique.

The separator 10 as previously described herein in reference to FIG. 1 may be used in the lithium ion battery 20. As shown in FIG. 2, the separator 10 includes the adhesive coating 14 and the porous polymer layer 16 disposed on the first side $S_1$, the second side $S_2$ or both the first and second sides $S_1$, $S_2$ of the non-woven substrate 12. The separator 10 operates as both an electrical insulator and a mechanical support. The separator 10 is sandwiched between the negative electrode 22 and the positive electrode 26 to prevent physical contact between the two electrodes 22, 26 and the occurrence of a short circuit. The separator 10, in addition to providing a physical barrier between the two electrodes 22, 26, ensures passage of lithium ions (identified by the black dots and by the open circles having a (+) charge in FIG. 2) and some related anions through the electrolyte filling its pores.

The negative electrode 22, the positive electrode 26, and the separator 10 are soaked in an electrolyte that is capable of conducting lithium ions. The electrolyte depends, in part, on the type of battery that is being formed. For the lithium ion battery 20, the electrolyte may include an organic solvent and a lithium salt that dissolves in the organic solvent. Examples of the organic solvent include cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof. Examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI or Lithium Bis(Trifluoromethanesulfonyl)Imide), $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof.

The lithium ion battery 20 may support a load device 31 that can be operatively connected to the external circuit 32. The load device 31 receives a feed of electrical energy from the electric current passing through the external circuit 32 when the lithium ion battery 20 is discharging. While the load device 31 may be any number of known electrically-powered devices, a few specific examples of a power-consuming load device include an electric motor for a hybrid vehicle or an all-electrical vehicle, a laptop computer, a cellular phone, and a cordless power tool. The load device 31 may also, however, be an electrical power-generating apparatus that charges the lithium ion battery 20 for purposes of storing energy. For instance, the tendency of windmills and solar panels to variably and/or intermittently generate electricity often results in a need to store surplus energy for later use.

The lithium ion battery 20 can also include a wide range of other components. For instance, the lithium ion battery 20 may include a casing, gaskets, terminals, tabs, and any other desirable components or materials that may be situated between or around the negative electrode 22 and the positive electrode 26 for performance-related or other practical purposes. Moreover, the size and shape of the lithium ion battery 20, as well as the design and chemical make-up of its main components, may vary depending on the particular application for which it is designed. Battery-powered automobiles and hand-held consumer electronic devices, for example, are two instances where the lithium ion battery 20 would most likely be designed to different size, capacity, and power-output specifications. The lithium ion battery 20 may also be connected in series and/or in parallel with other similar lithium ion battery 20 to produce a greater voltage output and current (if arranged in parallel) or voltage (if arranged in series) if the load device 31 so requires.

The lithium ion battery 20 generally operates by reversibly passing lithium ions between the negative electrode 22 and the positive electrode 26. In the fully charged state, the voltage of the battery 20 is at a maximum (typically in the range 2.0 volts to 5.0 volts); while in the fully discharged state, the voltage of the battery 20 is at a minimum (typically in the range 0 volts to 3.0 volts). Essentially, the Fermi energy levels of the active materials in the positive and negative electrodes 26, 22 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 31 enables an electronic current flow in the external circuit 32 with a direction such that the difference between the Fermi levels (and, correspondingly, the cell voltage) decreases. The reverse happens during battery charging: the battery charger forces an electronic current flow in the external circuit 32 with a direction such that the difference between the Fermi levels (and, correspondingly, the cell voltage) increases.

At the beginning of a discharge, the negative electrode 22 of the lithium ion battery 20 contains a high concentration of intercalated lithium while the positive electrode 26 is relatively depleted. When the negative electrode 22 contains a sufficiently higher relative quantity of intercalated lithium, the lithium ion battery 20 can generate a useful electric current during battery discharge by way of reversible electrochemical reactions that occur when the external circuit 32 is closed to connect the negative electrode 22 and the positive electrode 26 at a time when the negative electrode 22 contains a sufficiently high relative quantity of intercalated lithium. The chemical potential difference between the positive electrode 26 and the negative electrode 22 (ranging from approximately 1.5 volts to 5.0 volts, depending on the exact chemical make-up of the electrodes 26, 22) drives electrons (e⁻) produced by the oxidation of intercalated lithium at the negative electrode 22 through the external circuit 32 towards the positive electrode 26. Lithium ions, which are also produced at the negative electrode 22, are concurrently carried by the electrolyte solution through the separator 10 and towards the positive electrode 26. The electrons (e⁻) flowing through the external circuit 32 and the lithium ions migrating across the separator 10 in the electrolyte eventually reconcile and form intercalated lithium at the positive electrode 26. The electric current passing through the external circuit 32 can be harnessed and directed through the load device 31 until the intercalated lithium in the negative electrode 22 falls below a workable level or is depleted, or the need for electrical energy ceases.

The lithium ion battery 20 may be recharged after a partial or full discharge of its available capacity. To charge the lithium ion battery 20, an external battery charger is connected to the positive and the negative electrodes 26, 22 to drive the reverse of battery discharge electrochemical reactions. The connection of an external power source to the lithium ion battery 20 compels the otherwise non-spontaneous oxidation of lithium transition metal oxide at the positive electrode 26 to produce electrons and release lithium ions. The electrons (e⁻), which flow back towards the negative electrode 22 through the external circuit 32, and the lithium ions, which are carried by the electrolyte across the separator 10 back towards the negative electrode 22, reunite at the negative electrode 22 and replenish the negative electrode 22 with intercalated lithium for consumption during the next battery discharge cycle.

The external power source that may be used to charge the lithium ion battery 20 may vary depending on the size, construction, and particular end-use of the lithium ion battery 20. Some suitable external power sources include a battery charger plugged into an AC wall outlet and a motor vehicle alternator.

Referring now to FIG. 3, the lithium sulfur battery 30 is shown including examples of the separator 10 disclosed herein. The lithium sulfur battery 30 includes the negative electrode 22, the positive electrode 26', and the separator 10. The negative electrode 22 and the positive electrode 26' are disposed on the negative electrode current collector 24 and the positive electrode current collector 28, respectively. The lithium sulfur battery 30 also includes an interruptible external circuit 32 that connects the negative electrode 22 and the positive electrode 26'. It is to be understood that the same components used to form the negative electrode 22 and the positive and negative electrode current collectors 28, 24 of the lithium ion battery 20 may also be used to form the negative electrode 22 and the positive and negative electrode current collectors 28, 24 of the lithium sulfur battery 30.

The positive electrode 26' may include an active material, a conductive filler, and a polymer binder. For a lithium sulfur battery 30, the positive electrode active material may be formed from any sulfur-based active material that can sufficiently undergo lithium alloying and dealloying with aluminum or another suitable current collector functioning as the positive terminal of the lithium sulfur battery 30. Examples of sulfur-based active materials include $S_8$, $Li_2S_8$, $Li_2S_6$, $Li_2S_4$, $Li_2S_2$, and $Li_2S$. Another example may be a sulfur-carbon composite, having a ratio of sulfur:carbon ranging from 1:9 to 9:1.

The conductive filler and polymer binder of the positive electrode 26' may be formed from the same materials as previously disclosed herein in reference to the positive electrode 26 shown in FIG. 2.

The separator 10 as previously described herein in reference to FIG. 1 may be used in the lithium sulfur battery 30. As shown in FIG. 3, the separator 10 may include the adhesive coating 14 and the porous polymer layer 16 disposed on the first side $S_1$, the second side $S_2$ or both the first and second sides $S_1$, $S_2$ of the non-woven substrate 12. The separator 10 operates as both an electrical insulator and a mechanical support. The separator 10 is sandwiched between the negative electrode 22 and the positive electrode 26' to prevent physical contact between the two electrodes 22, 26' and the occurrence of a short circuit. The separator 10, in addition to providing a physical barrier between the two electrodes 22, 26' ensures passage of lithium ions (identified by the $Li^+$) and some related anions through additional electrolyte filling its pores (not shown).

The negative electrode 22, the positive electrode 26', and the separator 10 are soaked in an electrolyte that is capable of conducting lithium ions. As previously mentioned herein, the electrolyte depends, in part, on the type of battery that is being formed. For the lithium sulfur battery 30, electrolyte may include an ether based solvent, and a lithium salt that dissolves in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Any of the previously listed examples of the lithium salts may also be dissolved in the ether based solvent.

As previously mentioned herein, the positive electrode 26' and negative electrode 22 are in contact, respectively, with current collectors 28, 24. Each of the negative-side current collector 24 and the positive-side current collector 28 collects and moves free electrons to and from the external circuit 32.

The lithium sulfur battery 30 may support a load device 31 that can be operatively connected to the external circuit 32, which connects the negative electrode 22 and positive electrode 26'. The load device 31 receives a feed of electrical energy from the electric current passing through the external circuit 32 when the lithium sulfur battery 30 is discharging. As such, the load device 31 may be powered fully or partially by the electric current passing through the external circuit 32 when the lithium sulfur battery 30 is discharging. Any examples of the load device 31 provided herein may be used in the lithium sulfur battery 30.

The lithium sulfur battery 30 may also include a wide range of other components. For instance, the lithium sulfur battery 30 may include a casing, gaskets, terminals, tabs, and any other desirable components or materials that may be situated between or around the negative electrode 22 and the positive electrode 26' for performance-related or other practical purposes. Moreover, the size and shape of the lithium sulfur battery 30, as well as the design and chemical make-up of its main components, may vary depending on the particular application for which it is designed. Battery-powered automobiles and hand-held consumer electronic devices, for example, are two instances where the lithium sulfur battery 30 would most likely be designed to different size, capacity, and power-output specifications. The lithium sulfur battery 30 may also be connected in series and/or in parallel with other similar lithium sulfur batteries 30 to produce a greater voltage output and current (if arranged in parallel) or voltage (if arranged in series) if the load device 31 so requires.

The lithium sulfur battery 30 can generate a useful electric current during battery discharge (shown by reference numeral 36 in FIG. 3). During discharge, the chemical processes in the battery 30 include lithium ($Li^+$) dissolution from the surface of the negative electrode 22 and incorporation of the lithium cations into alkali metal polysulfide salts (i.e., $Li_2S_n$, such as $Li_2S_8$, $Li_2S_6$, $Li_2S_4$, $Li_2S_3$, $Li_2S_2$, and $Li_2S$) in the positive electrode 26'. As such, as lithium ions lithiate the positive electrode 26', polysulfides are formed (sulfur is reduced) on the surface of the positive electrode 26' in sequence while the battery 30 is discharging. The chemical potential difference between the positive electrode 26' and the negative electrode 22 (ranging from approximately 1.5 volts to 3.0 volts, depending on the exact chemical make-up of the electrodes 22, 26') drives electrons produced by the dissolution of lithium at the negative electrode 22 through the external circuit 32 towards the positive electrode 26'. The resulting electric current passing through the external circuit 32 can be harnessed and directed through the load device 31 until the lithium in the negative electrode 22 is depleted and the capacity of the lithium sulfur battery 30 is diminished, or until the level of lithium in the negative electrode 22 falls below a workable level, or until the need for electrical energy ceases.

The lithium sulfur battery 30 can be charged or re-powered at any time by applying an external power source to the lithium sulfur battery 30 to reverse the electrochemical reactions that occur during battery discharge. During charging (shown at reference numeral 34 in FIG. 3), lithium plating to the negative electrode 22 takes place, and sulfur formation at the positive electrode 26' takes place. The connection of an external power source to the lithium sulfur battery 30 compels the otherwise non-spontaneous oxidation of lithium at the positive electrode 26' to produce electrons and lithium ions. The electrons, which flow back towards the negative electrode 22 through the external circuit 32, and the lithium ions ($Li^+$), which are carried by the electrolyte across the separator 10 back towards the negative electrode 22, reunite at the negative electrode 22 and replenish it with lithium for consumption during the next battery discharge cycle. The external power source that may be used to charge the lithium sulfur battery 30 may vary depending on the size, construction, and particular end-use of the lithium sulfur battery 30. Some suitable external power sources include a battery charger plugged into an AC wall outlet and a motor vehicle alternator.

To further illustrate the present disclosure, examples are given herein. It is to be understood that these examples are provided for illustrative purposes and are not to be construed as limiting the scope of the disclosure.

EXAMPLES

Example 1

A comparative example (shown in FIGS. 4A and 4B), and two examples of the separator disclosed herein (shown in FIGS. 5A and 5B and FIGS. 6A and 6B) were prepared. Cellulose fiber mats were used as the non-woven substrate for both the comparative example and example separators.

A polymer solution was prepared by adding polyetherimide (PEI) as the polymer to N-methyl-2-pyrrolidone (NMP) as the solvent. More particularly, the polymer solution had 15 parts of PEI and 85 parts of NMP. Additionally, 25 wt % of fumed silica (based on the weight of the PEI polymer) was mechanically dispersed in the polymer solution.

Figure 4A:
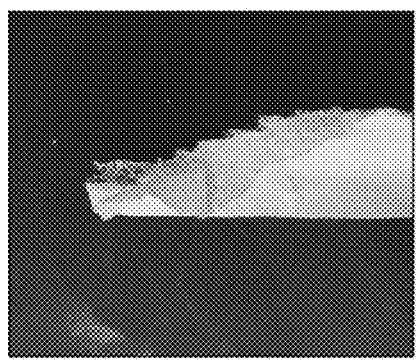
FIGS. 4A and 4B are a photograph and a magnified photograph, respectively, of a comparative example of a separator with no adhesive coating.
Figure 4B:
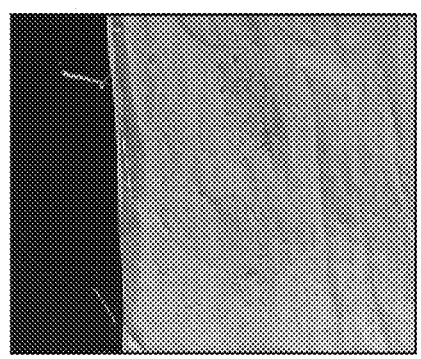

In the comparative example shown in FIGS. 4A and 4B, the polyimide solution was die coated directly onto one side of (and thus on the pore walls of) the non-woven substrate without any adhesive coating.

Figure 5A:
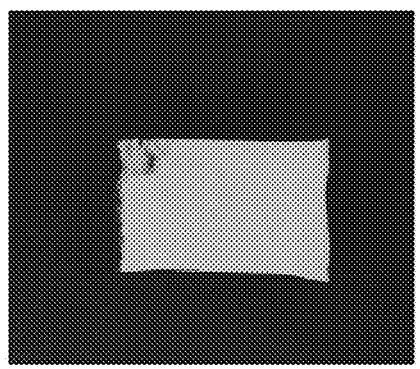
FIGS. 5A and 5B are a photograph and a magnified photograph, respectively, of an example of a separator disclosed herein.
Figure 5B:
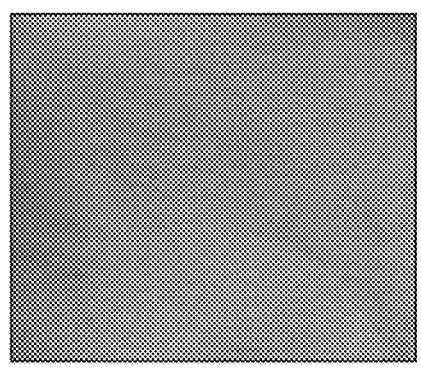

For the example separator shown in FIGS. 5A and 5B, the non-woven substrate was dip coated in sodium stearate to form the adhesive coating on both sides of the mat and on the pore walls/fiber surfaces of the mat. After dip coating the non-woven substrate, the substrate was dried at 70° C. for 3 minutes to form the adhesive coating. The polyimide solution was die coated onto one side of the adhesive coating.

Figure 6A:
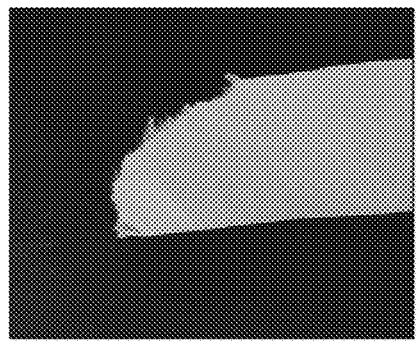
FIGS. 6A and 6B are a photograph and a magnified photograph, respectively, of another example of a separator disclosed herein.
Figure 6B:
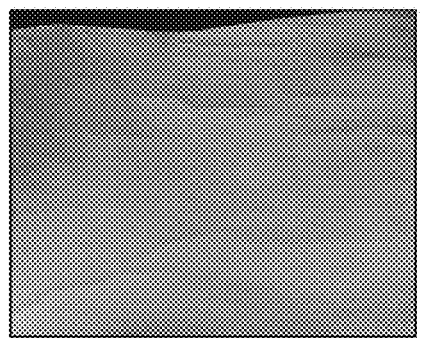

For the example separator shown in FIGS. 6A and 6B, the non-woven substrate was dip coated in dodecylbenezenesulfonate or polyoxyethylene glycol octylphenol ether to form the adhesive coating on both sides of the mat and on the pore walls of the mat. After dip coating the non-woven substrate, the substrate was dried at 70° C. for 3 minutes to form the adhesive coating. The polyimide solution was die coated onto one side of the adhesive coating.

After applying the polyimide solution, the comparative example separator, and the two example separators were deposited into a humidity chamber with water vapor as the non-solvent. The humidity chamber had a relative humidity of 90% at a temperature of 30° C. The comparative and example separators were left in the humidity chamber for 20 seconds. Exposure to water vapor induced phase inversion, where the PEI precipitated out of solution to form the porous polymer layer on the comparative and example separators.

Each of the comparative separator and the two example separators was subjected to a peel test to qualitatively determine how strong the porous polymer layer was bonded to the non-woven substrate. As shown in FIGS. 4A and 4B, the porous PEI layer was easily peeled away from the non-woven substrate of the comparative example, which included no adhesive coating. The example separators, which included adhesive coatings, exhibited significant improvement in the adhesion between the porous PEI layer and the non-woven substrate. As shown in FIG. 5A, only a small portion of the porous PEI layer was able to be peeled away from the cellulose fiber mat when sodium stearate was utilized as the adhesive coating. When dodecylbenezenesulfonate was used as the adhesive coating, the entire separator was ripped, but the porous PEI layer was not removed from the non-woven mat (as shown in FIG. 6B). In comparing FIGS. 4B, 5B, and 6B, improved coating quality can be observed when the adhesive coatings were used.

It is believed that the improved adhesion in the example separators is due to the adhesive coating that forms the intermediate layer between the non-woven mat and the porous polymer layer. The adhesive coating forms stronger bonds between the porous polyimide layer and the non-woven substrate. As a result, the separator is easier to handle and has an increased durability compared to separators without the adhesive coating.

Example 2

In Example 2, the example separator from Example 1 prepared with sodium stearate as the adhesive coating was utilized. Also in Example 2, a polypropylene separator (i.e., CELGARD® 2500) was utilized as the comparative example.

In this example, an electrochemical cell was formed with the comparative and example separators. The cell was formed by sandwiching the comparative and example separators between two stainless steel electrodes and saturating the cell with a liquid electrolyte to fill the inter-electrode space. The electrolyte was 1M $LiPF_6$ in EC (ethylene carbonate)/DMC (dimethyl carbonate) in a 1:1 volume ratio. The electrochemical cell was cycled while measuring the bulk resistance on an SI 1260 impedance gain analyzer available from Solartron Analytical. The effective ionic conductivities were calculated for the comparative and example separators. The effective ionic conductivities were calculated from the following equation:

$$\sigma = \frac{d}{R_b \cdot S} = \frac{1}{\rho} \qquad (I)$$

where d is the thickness of the film, $R_b$ is the bulk resistance, and S is the area of the electrode. The results are shown below in Table 1.

TABLE 1

| Separator | Conductivity (mS/cm) |
|---|---|
| Comparative example | 1.47 |
| Example separator | 1.52 |

As depicted, the electrical performance of the example separator disclosed herein is slightly better (in terms of conductivity) when compared to a polyolefin separator. This shows that the addition of the adhesive coating does not deleteriously affect the wettability of the example separator in electrolyte or the conductivity of the example separator.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 100 nm to about 1 μm should be interpreted to include not only the explicitly recited limits of from about 100 nm to about 1 μm, but also to include individual values, such as 300 nm, 400 nm, 500 nm, etc., and sub-ranges, such as from about 100 nm to about 920 nm; from about 250 nm to about 400 nm, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A separator, comprising:
a non-woven substrate including a first side and a second side;
an adhesive coating disposed on the first side, the second side, or both the first and the second sides of the non-woven substrate, wherein the adhesive coating is a surfactant that is an amphiphilic organic compound selected from the group consisting of sodium stearate, dodecylbenzenesulfonate, ammonium lauryl sulfate, an alkyl-ether sulfate, sodium lauryl sulfate, an alkyl-aryl ether phosphate, an alkyl ether phosphate, ammonium bromide, a carboxylate, octaethylene glycol monododecyl ether, decyl glucoside, polyoxyethylene glycol octylphenol ethers, and combinations thereof; and
a porous polymer layer disposed on the adhesive coating such that the adhesive coating forms an intermediate layer between the non-woven substrate and the porous polymer layer.

2. The separator as defined in claim 1 wherein the non-woven substrate is a non-polyolefin based substrate selected from the group consisting of cellulose fibers, polyethylene naphthalate, aramid fibers, polyimide, and polyethylene terephthalate (PET).

3. The separator as defined in claim 1 wherein the non-woven substrate has a contact angle of less than 90° when exposed to a battery electrolyte comprising a lithium salt selected from the group consisting of: $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$, $LiN(CF_3SO_2)_2$, $LiPF_6$, $LiB(C_2O_4)_2$, $LiBF_2(C_2O_4)$, $LiPF_4(C_2O_4)$, $LiNO_3$, and combinations thereof; and
an organic solvent selected from the group consisting of: ethylene carbonate, propylene carbonate, butylene carbonate, fluoroethylene carbonate, dimethyl carbonate, diethyl carbonate, ethylmethyl carbonate, methyl formate, methyl acetate, methyl propionate,γ-butyrolactone, γ-valerolactone, 1,2-dimethoxyethane, 1-2-diethoxyethane, ethoxymethoxyethane, tetraglyme, tetrahydrofuran, 2-methyltetrahydrofuran, 1,3-dioxolane, and combinations thereof.

4. The separator as defined in claim 1 wherein the non-woven substrate exhibits a volume shrinkage of less than 5% when heated to 100° C. for about 2 hours.

5. The separator as defined in claim 1 wherein the porous polymer layer is a precipitated polymer layer formed from a polymer, a solvent, and a non-solvent.

6. The separator as defined in claim 5 wherein the polymer is selected from the group consisting of polyvinylidene fluoride (PVDF), polyamides, polyimides, polysulfone, and combinations thereof.

7. The separator as defined in claim 5 wherein:
i) the polymer is polyvinylidene fluoride (PVDF), the solvent is acetone, and the non-solvent is water or water vapor; or
ii) the polymer is polyetherimide or meta-aramid, the solvent is N-methyl-2-pyrrolidone (NMP), dimethylacetamide (DMAc), dimethylformamide (DMF), dimethyl sulfoxide containing LiCl or $CaCl_2$, N-methyl-2-pyrrolidone (NMP) containing LiCl or $CaCl_2$, or dimethylformamide (DMF) containing LiCl or $CaCl_2$, and the non-solvent is water or water vapor.

8. The separator as defined in claim 1 wherein the porous polymer layer further includes inorganic particles selected from the group consisting of alumina, silica, titania or combinations thereof.

9. A lithium-based battery, comprising:
a positive electrode;
a negative electrode;
a separator soaked in an electrolyte solution and disposed between the positive electrode and the negative electrode, the separator including:
   a non-woven substrate including a first side and a second side, wherein the non-woven substrate is a non-polyolefin based substrate selected from the group consisting of cellulose fibers, polyethylene naphthalate, aramid, polyimide, and polyethylene terephthalate (PET);
   an adhesive coating disposed on the first side, the second side, or both the first and the second side of the non-woven substrate, wherein the adhesive coating is a surfactant that is an amphiphilic organic compound selected from the group consisting of sodium stearate, dodecylbenzenesulfonate, ammonium lauryl sulfate, an alkyl-ether sulfate, sodium lauryl sulfate, an alkyl-aryl ether phosphate, an alkyl ether phosphate, ammonium bromide, a carboxylate, octaethylene glycol monododecyl ether, decyl glucoside, polyoxyethylene glycol octylphenol ethers, and combinations thereof; and
   a porous polymer layer disposed on the adhesive coating such that the adhesive coating forms an intermediate layer between the non-woven substrate and the porous polymer layer.

10. The lithium-based battery as defined in claim 9 wherein the non-woven substrate has a contact angle of less than 90° when exposed to the electrolyte solution comprising a lithium salt selected from the group consisting of: $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$, $LiN(CF_3SO_2)_2$, $LiPF_6$, $LiB(C_2O_4)_2$, $LiBF_2(C_2O_4)$, $LiPF_4(C_2O_4)$, $LiNO_3$, and combinations thereof; and
   an organic solvent selected from the group consisting of: ethylene carbonate, propylene carbonate, butylene carbonate, fluoroethylene carbonate, dimethyl carbonate, diethyl carbonate, ethylmethyl carbonate, methyl formate, methyl acetate, methyl propionate, γ-butyrolactone, γ-valerolactone, 1,2-dimethoxyethane, 1-2-diethoxyethane, ethoxymethoxyethane, tetraglyme, tetrahydrofuran, 2-methyltetrahydrofuran, 1,3-dioxolane, and combinations thereof, and exhibits a volume shrinkage of less than 5% when heated to 100° C. for about 2 hours.

11. A method of forming a separator, comprising:
coating a first side, a second side, or both the first and the second sides of a non-polyolefin, non-woven substrate with a surfactant that is an amphiphilic organic compound selected from the group consisting of sodium stearate, dodecylbenzenesulfonate, ammonium lauryl sulfate, an alkyl-ether sulfate, sodium lauryl sulfate, an alkyl-aryl ether phosphate, an alkyl ether phosphate, ammonium bromide, a carboxylate, octaethylene glycol monododecyl ether, decyl glucoside, polyoxyethylene glycol octylphenol ethers, and combinations thereof, thereby forming an adhesive coating on the non-polyolefin, non-woven substrate; or
forming a polymer solution including a polymer and a solvent of the polymer;
applying the polymer solution to the adhesive coating; and
precipitating the polymer from the polymer solution by exposing the polymer solution to a non-solvent, thereby forming a porous polymer layer disposed on the adhesive coating such that the adhesive coating forms an intermediate layer between the non-polyolefin, non-woven substrate and the porous polymer layer.

12. The method as defined in claim 11 wherein:
the surfactant is selected from the group consisting of sodium stearate, dodecylbenzenesulfonate, ammonium lauryl sulfate, an alkyl-ether sulfate, sodium lauryl sulfate, an alkyl-aryl ether phosphate, an alkyl ether phosphate, ammonium chloride, ammonium bromide, a carboxylate, octaethylene glycol monododecyl ether, decyl glucoside, polyoxyethylene glycol octylphenol ethers, and combinations thereof.

13. The method as defined in claim 11 wherein the non-polyolefin, non-woven substrate is selected from the group consisting of cellulose fibers, polyethylene naphthalate, aramid, polyimide, and polyethylene terephthalate (PET).

14. The method as defined in claim 11 wherein the polymer is selected from the group consisting of polyvinylidene fluoride (PVDF), polyamide, polyimides, polysulfone, and a combination thereof.

15. The method as defined in claim 11 wherein:
   i) the polymer is polyvinylidene fluoride (PVDF), the solvent is acetone, and the non-solvent is water or water vapor; or
   ii) the polymer is polyetherimide or meta-aramid, the solvent is N-methyl-2-pyrrolidone (NMP), dimethylacetamide (DMAc), dimethylformamide (DMF), or dimethyl sulfoxide containing LiCl or $CaCl_2$, N-methyl-2-pyrrolidone (NMP) containing LiCl or $CaCl_2$, or dimethylformamide (DMF) containing LiCl or $CaCl_2$, and the non-solvent is water or water vapor; or
   iii) a combination of i) and ii).

16. The method as defined in claim 11 wherein the polymer solution further includes inorganic particles selected from the group consisting of alumina, silica, titania, or combinations thereof; and
   during precipitation, the polymer and the inorganic particles are precipitated from the polymer solution.

17. The separator as defined in claim 1 wherein the non-woven substrate is porous and the adhesive coating is further disposed on surfaces of the pores within the non-woven substrate.

18. The lithium-based battery as defined in claim 9 wherein the non-woven substrate is porous and the adhesive coating is further disposed on surfaces of the pores within the non-woven substrate.

* * * * *